(No Model.)
J. R. BLAIR.
SPOON HOLDER.
No. 510,835.          Patented Dec. 12, 1893.
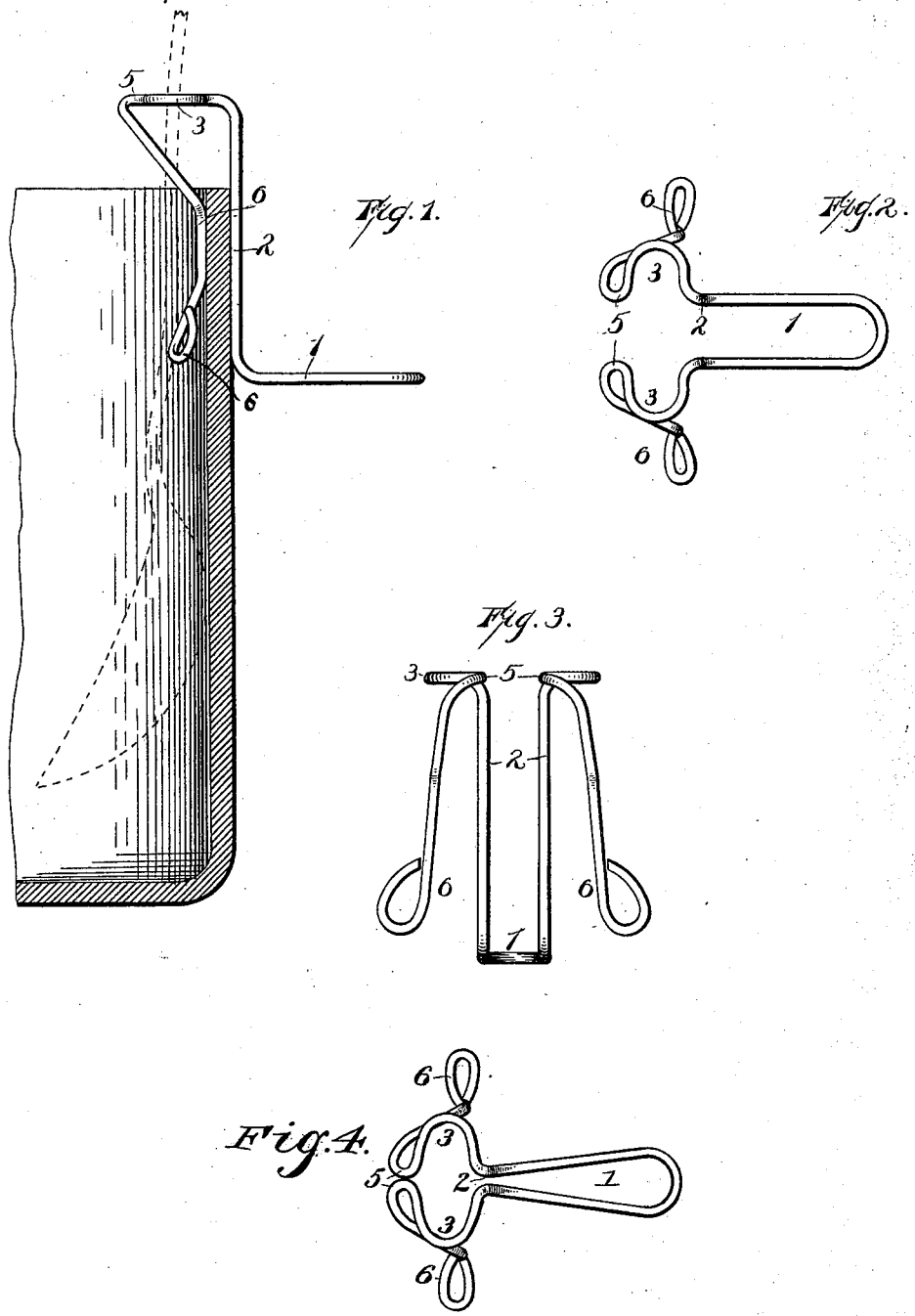
Witnesses
C. S. Frye
G. T. Myers
J. R. Blair
Inventor
By Hopkins & Atkins
Attorneys

UNITED STATES PATENT OFFICE.

JOHN R. BLAIR, OF SCHENECTADY, NEW YORK.

SPOON-HOLDER.

SPECIFICATION forming part of Letters Patent No. 510,835, dated December 12, 1893.

Application filed January 19, 1893. Serial No. 458,968. (No model.)

*To all whom it may concern:*

Be it known that I, JOHN R. BLAIR, of Schenectady, county of Schenectady, and State of New York, have invented a certain new and useful Spoon-Holder, of which the following is a specification, reference being had to the accompanying drawings.

The object of my invention is to produce a device which may be readily fastened upon or separated from the rim of a pot, or other kitchen utensil; and which is adapted to hold the handle of a spoon or other article and prevent its slipping into the pot.

In the accompanying drawings, Figure 1 is a side elevation of my holder, shown as fastened to a section of a pot. Fig. 2 is a top view of my holder, showing the jaws expanded. Fig. 3 is an end view thereof, looking toward the handle. Fig. 4 is a top view of the holder, showing the jaws closed.

Referring to the figures on the drawings, 1 indicates the handle of my holder. It is preferably made of spring wire, and has prolonged sides 2 which converge at their upper end and are yieldingly held in proximity to one another by the spring action of the handle. The sides 2 constitute what may be called, for convenience, the frame of my device.

3 indicates oppositely curved bends or jaws, which are preferably bent into a plane parallel with the handle. Their forward ends 5 approach close to one another and are also yieldingly held in such proximity by the spring action of the handle. 6 indicates the clip ends of my holder, and may be bent in any suitable manner so as to give them finish, and to make them approach to yieldingly hold the edge of a utensil which is thrust between them and the frame 2. The clip ends should be bent abruptly back from the forward ends of the bends 3, so that they may not obstruct in any manner the opening into the bends.

I have described my holder as formed of a single piece of spring wire, that being the simplest form of making it, but I do not confine myself to a holder made entirely of wire.

In operation the holder being taken by the handle may be slipped over the edge of the utensil upon which it is to be applied; and that without touching the utensil, and without reference to its heated condition. The holder is shown in such position in Fig. 1 of the drawings. While in this position a spoon for example may be readily slipped between the ends 5 of the loops, which immediately close upon it, and hold it, preventing it from falling into the utensil, and presenting it ever ready for use as required.

What I claim is—

In a holder, the combination with a spring handle and sides held thereby in yielding proximity, of bends in a plane parallel with the handle, and spring clip ends bent abruptly back from the forward ends of the bends, substantially as and for the purpose specified.

In testimony of all which I have hereunto subscribed my name.

JOHN R. BLAIR.

Witnesses:
MATHEW MOLLOY,
HENRY SCHERMERHORN.